(12) United States Patent  
Loch et al.

(10) Patent No.: US 11,965,753 B2
(45) Date of Patent: Apr. 23, 2024

(54) POSITIONING DATA VERIFICATION SYSTEM

(71) Applicant: Transportation IP Holdings, LLC, Norwalk, CT (US)

(72) Inventors: Mark Elliott Loch, Fairview, PA (US); Shawn Arthur McClintic, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 519 days.

(21) Appl. No.: 17/266,326

(22) PCT Filed: Aug. 5, 2019

(86) PCT No.: PCT/US2019/045118
§ 371 (c)(1),
(2) Date: Feb. 5, 2021

(87) PCT Pub. No.: WO2020/086137
PCT Pub. Date: Apr. 30, 2020

(65) Prior Publication Data
US 2021/0318139 A1 Oct. 14, 2021

Related U.S. Application Data

(60) Provisional application No. 62/715,096, filed on Aug. 6, 2018.

(51) Int. Cl.
*G01C 21/00* (2006.01)
*G01S 19/21* (2010.01)
*H04W 4/029* (2018.01)

(52) U.S. Cl.
CPC ..... *G01C 21/3833* (2020.08); *G01C 21/3807* (2020.08); *G01S 19/21* (2013.01); *G01S 19/215* (2013.01); *H04W 4/029* (2018.02)

(58) Field of Classification Search
None
See application file for complete search history.

(56) References Cited

U.S. PATENT DOCUMENTS 5,598,167 A  1/1997  Zijderhand
6,952,631 B2  10/2005  Griffith et al.
(Continued)

FOREIGN PATENT DOCUMENTS

AU  710752 B2  2/1996
CA  2698053 A1  12/2012
(Continued)

OTHER PUBLICATIONS

International Preliminary Report on Patentability for corresponding International Application No. PCT/US2019/45118 dated Feb. 18, 2021 (19 pages).
(Continued)

*Primary Examiner* — Adam D Tissot
(74) *Attorney, Agent, or Firm* — The Small Patent Law Group LLC; Josef L. Hoffmann

(57) ABSTRACT

A system and method examine positional data signals onboard a vehicle to identify one or more variations in positioning data of the positional data signals. The system and method identify inaccurate positioning data in the positional data signals based on the one or more variations in the positioning data that are identified.

12 Claims, 4 Drawing Sheets

(56) References Cited

U.S. PATENT DOCUMENTS

| | | | |
|---|---|---|---|
| 8,044,847 B1* | 10/2011 | Kling | H01Q 3/24 342/357.34 |
| 8,311,730 B2 | 11/2012 | Neff | |
| 8,473,196 B2 | 6/2013 | Basnayake | |
| 8,862,291 B2 | 10/2014 | Sharma et al. | |
| 8,922,427 B2 | 12/2014 | Dehnie et al. | |
| 8,930,059 B2 | 1/2015 | Neff | |
| 9,257,050 B2 | 2/2016 | Fleiger-Holmes et al. | |
| 9,523,774 B2 | 12/2016 | Davies | |
| 9,813,387 B2 | 11/2017 | Loch | |
| 2004/0049336 A1 | 3/2004 | Knockeart et al. | |
| 2010/0045506 A1* | 2/2010 | Law | G01S 19/21 342/13 |
| 2011/0022246 A1* | 1/2011 | Rieth | G08G 1/0969 701/1 |
| 2013/0018578 A1 | 1/2013 | Matsuo et al. | |
| 2013/0018579 A1 | 1/2013 | Hamilton | |
| 2016/0078695 A1 | 3/2016 | McClintic et al. | |
| 2016/0146944 A1 | 5/2016 | Geren et al. | |
| 2016/0154113 A1 | 6/2016 | Leibner et al. | |
| 2017/0070971 A1* | 3/2017 | Wietfeldt | H04W 24/10 |
| 2017/0357009 A1* | 12/2017 | Raab | G01S 19/35 |
| 2019/0294167 A1 | 9/2019 | Kutila et al. | |
| 2020/0172131 A1 | 6/2020 | Kernwein | |
| 2020/0195426 A1 | 6/2020 | Dreasher et al. | |

FOREIGN PATENT DOCUMENTS

| | | |
|---|---|---|
| CN | 104867356 B | 8/2015 |
| CN | 205451514 U | 8/2016 |
| EP | 1912077 A2 | 4/2008 |
| EP | 2593346 B1 | 10/2017 |
| WO | 2013006826 A2 | 1/2013 |

OTHER PUBLICATIONS

Examination Report No. 2 dated May 3, 2022 for corresponding Australian Application No. 2019366249 (4 pages).

International Preliminary Report on Patentability for corresponding International Application No. PCT/US2019/45118 dated Jul. 15, 2020.

Lundberg, et al: "Novel Timing Antennas for Improved GNSS Resilience". Distribution Unlimited. Case No. 18-0336 / DHS reference No. 17-J-00100-03, 2018 The MITRE Corporation. 14 pages.

Magiera, et al: "Detection and Mitigation of GPS Spoofing Based on Antenna Array Processing". Department of Radio Communications Systems and Networks Gdansk University of Technology, Gdansk, Poland. Journal of Applied Research and Technology. pp. 45-57.

O'Hanlon, et al: Real-Time Spoofing Detection Using Correlation Between Two Civil GPS Receiver. Preprint from Ion GNSS 2012. 7 pages.

Psiaki, et al.: "GNSS Spoofing and Detection". 11pages.

Psiaki, et al: "GPS Spoofing Detection System". Published Cornell University, 1 page.

Psiaki, et al: "Protecting GPS From Spoofers is Critical to the Future of Navigation. GPS is vulnerable to spoofing attacks. Here's how we can defend these important navigation signals." https://spectrum.ieee.org/telecom/security/protecting-gps-from-spoofers-is-critical-to-the-future-of-navigation. Jul. 29, 2016. 12 pages.

Marais, et al: "A Survey o fGNSS-Based Research and Developments for the European Railway Signaling", IEEE Transactions on Intelligent Transportation Systems, 2017, 10(18), p. 2602-2618., 10.1109/TITS.2017.2658179hal-01489152v3.

Wesson, et al: "Practical Cryptographic Civil GPS Signal Authentication". NAVIGATION: The Journal of the Institute of Navigation, Feb. 2012. 15 pages.

Partial supplementary European search report dated Mar. 7, 2022 for corresponding Application No. 19876646.1 (16 pages).

Examination Report dated Jan. 27, 2022 for corresponding Australian Application No. 2019366249. (4 pages).

Extended European Search Report dated Jun. 3, 2022 for corresponding European Patent Application 19 876 646.1 (15 pages).

Examination Report dated May 5, 2022 for corresponding Indian Application No. 202117003435 (8 pages).

Examination Report mailed Oct. 30, 2023 for corresponding Application No. 2022259834 (5 pages).

Examiner's Requisition dated Sep. 12, 2023 for corresponding Canadian Patent Application No. 3,107,979 (4 pages).

* cited by examiner

POSITIONING DATA VERIFICATION SYSTEM

CROSS-REFERENCE TO RELATED APPLICATIONS

This application is a national stage entry of International PCT Application No. PCT/US2019/045118, filed on 5 Aug. 2019, which claims priority to U.S. Provisional Application No. 62/715,096, filed on 6 Aug. 2018. The entire disclosures of these applications are incorporated herein by reference.

BACKGROUND

Technical Field

Embodiments of the present disclosure generally relate to systems and methods for verifying the accuracy of positional data.

Discussion of Art

Vehicles may rely on accurate tracking of locations of the vehicles. For example, vehicles may include devices that communicate data signals with each other to control operation of the vehicles, e.g., when locomotives are coupled in a train. The devices of the vehicles may share information to determine speed, acceleration, braking actions, or the like, of the vehicles. These devices can include or can use a global positioning system (GPS) or other global navigation satellite systems (GNSS) to determine precise position, navigation, and timing information. This positioning, navigation, and timing (PNT) information can be used to provide data to determine the location of the vehicles, the speed of the vehicles, speed limits of the route being traveled upon, locations where braking is required, elevation, or other information. Similar considerations apply to other vehicles.

Because GPS is a radio-based service, it is subject to interference from both natural and man-made sources. A vehicle using GPS for navigating a route can lose reception due to many factors the least of which is intentional jamming of the GPS radio frequencies. The GPS frequencies can be jammed or "spoofed" to cause the vehicle to appear at a different location. Additionally, the GPS signals can be negatively impacted by environmental factors, such as travel through canyons, urban areas, solar radiation effects, and the like.

The spoofing can be either measurement spoofing or data spoofing. Measurement spoofing occurs when the received radio frequencies are altered causing the device to produce inaccurate measurements of arrival times. The distance from the satellite is calculated by using the time broadcast by the satellite and the time the signal arrives at the vehicle. The vehicle uses this information to calculate its distance from the satellite. Data spoofing provides incorrect PNT data to the controllers being used for vehicle operation.

The "spoofed" or malicious signals to a vehicle could alter operation of the vehicles. For example, rail vehicles may receive signals that cause the rail vehicles to ignore speed limits, braking instructions, or the like. These signals can result in the vehicles operating in unintended manners.

BRIEF DESCRIPTION

In one embodiment, a method includes examining positional data signals onboard a vehicle to identify one or more variations in positioning data of the positional data signals, and identifying inaccurate positioning data in the positional data signals based on the one or more variations in the positioning data that are identified.

In one embodiment, a method includes receiving wireless positional data signals at antennas of a global navigation satellite system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal. The method also includes tracking hysteresis in signal strengths of the positional data signals received at each of the antennas, and identifying at least one of the communication devices as being a faulty device, a spoofing device, or a jamming device, or that environmental factors are causing the communication device to send an inaccurate positional data signal in response to the hysteresis in the signals strength of the positional data signals received at one of the antennas increasing or decreasing by more than a designated threshold value while the hysteresis in the signal strength of the positional data signals received at a different antenna not increasing or decreasing by more than the designated threshold value.

In one embodiment, a method includes receiving wireless positional data signals at one or more antennas of a global navigation satellite system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal. The method also includes determining an elevation of at least one of the communication devices at a security controller based on receipt of one or more of the positional data signals sent from the at least one communication device, and identifying the at least one communication device as a spoofing device or a jamming device that is sending inaccurate positioning data responsive to the elevation of the at least one communication device being within a designated spatial range of a horizon.

In one embodiment, a method includes receiving wireless positional data signals at one or more antennas of a global navigation satellite system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal. The method also includes determining whether the antenna of the global navigation satellite system receiver has received the positional data signals from a designated number of the communication devices for at least a designated period of time, determining whether the antenna of the global navigation satellite system receiver will be able to continue receiving the positional data signals from the designated number of the communication devices for at least an upcoming period of time, determining whether the positional data signals are received from a different number of the communication devices, and identifying at least one of the communication devices as a spoofing device or a jamming device that is sending inaccurate positioning data responsive to the different number of the communication devices differing from the designated number of the communication devices.

In one embodiment, a method includes receiving wireless positional data signals at one or more antennas of a global navigation satellite system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal, each of the positional data signals also including a unique identifier of the communication device that sent the positional data signal. The method also includes calculating signal-to-noise ratios of the positional data signals using the global navigation satellite system receiver, examining the positional data signals at a security controller by calculating signal-to-noise ratios of the positional data signals that are received by the antennas, and identifying at least one communication device as a spoofing device or a jamming device that is sending inaccurate positioning data responsive to both a change in the unique identifier of the at least one communication device and a change in the signal-to-noise ratio of the positional data signals received from the at least one communication device.

In one embodiment, a verification system includes a vehicle comprising a global navigation satellite system receiver that is onboard the vehicle. The global navigation satellite system receiver includes one or more antennas. The verification system also includes one or more communication devices located off-board the vehicle. The one or more antennas are configured to receive at least one wireless positional data signal from the one or more communication devices. Each positional data signal includes positioning data indicative of one or more of a location of the communication device that sent the positional data signal or a time at which the communication device sent the positional data signal. The verification system also includes a security controller operably coupled with the global navigation satellite system receiver. The global navigation satellite system receiver is configured to communicate the positioning data of the positional data signals to the security controller. The security controller is configured to examine the positional data signals to identify one or more variations in positioning data of the positional data signals, and identify inaccurate positioning data in the positional data signals based on the one or more variations in the positioning data that are identified. In other embodiments, the system is implemented in conjunction with vehicles other than vehicles.

In one embodiment, a system includes a vehicle comprising a global navigation satellite system receiver. The global navigation satellite system receiver is operably coupled with an antenna onboard the vehicle. The system also includes one or more communication devices located off-board the vehicle. The antennas are configured to receive wireless positional data signals from the communication devices. Each of the positional data signals includes positioning data indicative of one or more of a location of the communication device that sent the positional data signal or a time at which the communication device sent the positional data signal. The system also includes a security controller operably coupled with the global navigation satellite system receiver. The security controller is configured to track hysteresis in signal strengths of the positional data signals received at each of the antennas, and identify at least one of the communication devices as being a faulty device, a spoofing device, or a jamming device, or that environmental factors are causing the communication device to send an inaccurate positional data signal in response to the hysteresis in the signals strength of the positional data signals received at one of the antennas increasing or decreasing by more than a designated threshold value while the hysteresis in the signal strength of the positional data signals received at a different antenna not increasing or decreasing by more than the designated threshold value. In other embodiments, the system is implemented in conjunction with vehicles other than vehicles.

In one embodiment, a system includes a vehicle comprising a global navigation satellite system receiver. The global navigation satellite system receiver is operably coupled with an antenna onboard the vehicle. The system also includes one or more communication devices located off-board the vehicle. The antennas are configured to receive wireless positional data signals from the communication devices. Each of the positional data signals includes positioning data indicative of one or more of a location of the communication device that sent the positional data signal or a time at which the communication device sent the positional data signal. The system also includes a security controller operably coupled with the global navigation satellite system receiver. The security controller is configured to determine an elevation of at least one of the communication devices based on receipt of one or more of the positional data signals sent from the at least one communication device, and identify the at least one communication device as a spoofing device or a jamming device that is sending inaccurate positioning data responsive to the elevation of the at least one communication device being within a designated spatial range of a horizon. In other embodiments, the system is implemented in conjunction with vehicles other than vehicles.

In one embodiment, a system includes a vehicle comprising a global navigation satellite system receiver. The global navigation satellite system receiver is operably coupled with an antenna onboard the vehicle. The system also includes one or more communication devices located off-board the vehicle, wherein the antennas are configured to receive wireless positional data signals from the communication devices, each of the positional data signals including positioning data indicative of one or more of a location of the communication device that sent the positional data signal or a time at which the communication device sent the positional data signal. The system also includes a security controller operably coupled with the global navigation satellite system receiver. The security controller is configured to determine whether the antenna of the global navigation satellite system receiver has received the positional data signals from a designated number of the communication devices for at least a designated period of time, determine whether the antenna of the global navigation satellite system receiver will be able to continue receiving the positional data signals from the designated number of the communication devices for at least an upcoming period of time, determine whether the positional data signals are received from a different number of the communication devices, and identify at least one of the communication devices as a spoofing device or a jamming device that is sending inaccurate positioning data responsive to the different number of the communication devices differing from the designated number of the communication devices. In other embodiments, the system is implemented in conjunction with vehicles other than vehicles.

In one embodiment, a system includes a vehicle comprising a global navigation satellite system receiver. The global navigation satellite system receiver is operably coupled with an antenna onboard the vehicle. The system also includes one or more communication devices located off-board the vehicle. The antennas are configured to receive wireless positional data signals from the communication devices.

Each of the positional data signals includes positioning data indicative of one or more of a location of the communication device that sent the positional data signal or a time at which the communication device sent the positional data signal. Each of the positional data signals also includes a unique identifier of the communication device that sent the positional data signal. The system also includes a security controller operably coupled with the global navigation satellite system receiver. The security controller is configured to calculate signal-to-noise ratios of the positional data signals using the global navigation satellite system receiver, examine the positional data signals at a security controller by calculating signal-to-noise ratios of the positional data signals that are received by the antennas, and identify at least one communication device as a spoofing device or a jamming device that is sending inaccurate positioning data responsive to both a change in the unique identifier of the at least one communication device and a change in the signal-to-noise ratio of the positional data signals received from the at least one communication device. In other embodiments, the system is implemented in conjunction with vehicles other than vehicles.

BRIEF DESCRIPTION OF THE DRAWINGS

These and other features and aspects of embodiments of the specification are set forth in the following detailed description and may be read with reference to the accompanying drawings in which like characters represent like parts throughout the drawings, wherein.

DETAILED DESCRIPTION

Figure 1:
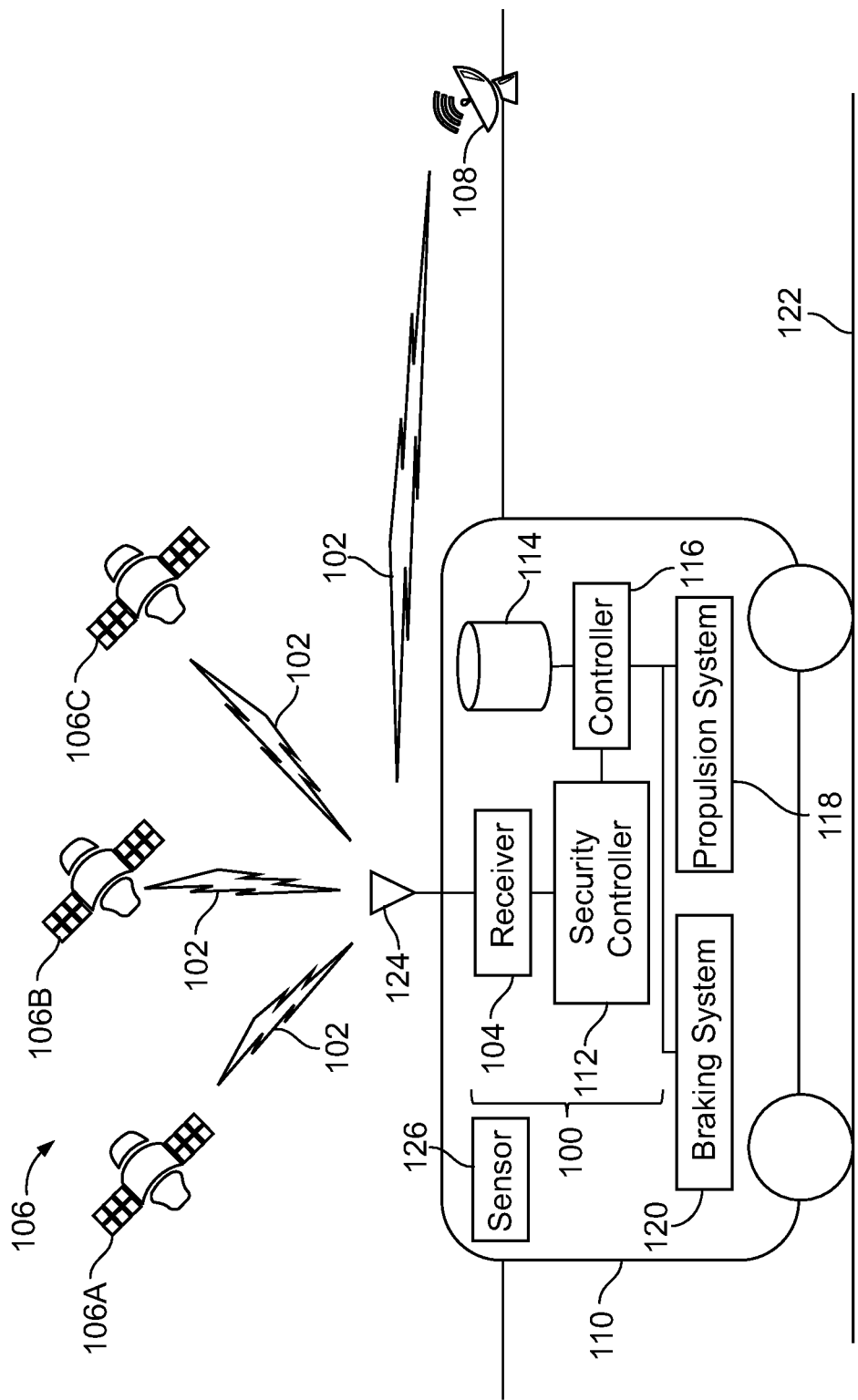
FIG. 1 illustrates one embodiment of a positioning data verification system.

Embodiments of the subject matter described herein relate to identifying inaccurate information in positional data signals. The subject matter can provide solutions to GNSS or GPS spoofing, GNSS or GPS jamming, environmental factors that negatively impact GNSS or GPS signals, faults or failures of devices that send GNSS or GPS signals, etc. FIG. 1 illustrates one embodiment of a positioning data verification system 100. The verification system 100 operates to check the validity and/or accuracy of positional data signals 102 that are wirelessly received by a receiver 104 from one or more external communication devices 106, 108 (e.g., external communication device 106 can include one or more of the external communication devices 106A-C shown in FIG. 1). The verification system may be entirely or partially disposed onboard a vehicle 110 using GPS or GNSS, whether the vehicle be terrestrial or airborne. For example, the vehicles described herein may be ground-based automobiles, trucks, buses, rail vehicles, mining vehicles, agricultural vehicles, or other off-highway vehicles (e.g., vehicles that are not designed for travel on public roadways and/or that are not legally permitted for travel on public roadways). Optionally, the vehicles described herein may be airborne vehicles, such as fixed wing aircraft, drones, or other aircraft. As another example, the vehicles described herein may be water-based vehicles, such as marine vessels.

The receiver can include one or more GNSS or GPS receivers or other onboard communication devices that are capable of wirelessly receiving the positional data signals. The external communication devices can represent devices that broadcast, transmit, or otherwise communicate the positional data signals. For example, one or more of the external communication devices can include GNSS or GPS satellites that broadcast or otherwise send GNSS or GPS signals as the positional data signals. In one embodiment, at least one of the external communication devices (e.g., the external communication device 108) represents a spoofing device that is wirelessly transmitting and/or broadcasting inaccurate positional data signals that do not accurately reflect the PNT information of the external communication device. Optionally, one or more of the external communication devices represents a jamming device that is wirelessly transmitting and/or broadcasting data signals that attempt to jam or otherwise overwhelm the receiver onboard the vehicle to prevent the vehicle from being able to accurately determine the location of the vehicle.

In another embodiment, the verification system operates to verify the accuracy of the positional data signals that are received by the vehicle, even when the positional data signals are not sent from a spoofing or jamming device. For example, successful communication of the positional data signals from one or more of the external communication devices may be interfered with due to environmental conditions (e.g., travel near tall buildings, travel through a canyon or tunnel, solar radiation, other weather conditions, etc.) and/or equipment conditions (e.g., failure of one or more components of the external communication device(s)). The verification system can operate to ensure that any vehicle positions that are determined based on received signals are accurate. This can help ensure the safe and/or efficient travel of the vehicle.

A security controller 112 of the verification system can detect inaccurate information in a received positional data signal, which can be the result of environmental and/or equipment conditions, and/or a data attack from an external communication device. In response, the security controller can either safely failover to a backup navigational system, turn control from automatic control of the vehicle to an operator, or even operate through an outage. By incorporating and adding integrity checks against a database 114, the security controller can determine at what location or time a GNSS or GPS outage will become critical or more necessary for safe travel (than one or more other locations).

For example, the security controller includes hardware circuitry that is connected with and/or includes one or more processors (e.g., one or more microprocessors, one or more integrated circuits, one or more field programmable gate arrays, or the like) that perform operations described herein in connection with the security controller. Movement of the vehicle can be automatically controlled by operation of a vehicle controller 116 ("Controller" in FIG. 1), which represents hardware circuitry that is connected with and/or includes one or more processors (one or more of the same or different processors as the security controller). The vehicle controller can automatically control operation of a propulsion system 118 (e.g., one or more engines, motors, propellers, steering systems, or the like) and/or a brake system 120 (e.g., one or more friction brakes, air brakes, regenerative brakes, etc.). For example, the vehicle controller can control movement of the vehicle in a fully automatic or autonomous manner such that no operator input is required to control the heading in which the vehicle is moving, the speeds at which the vehicle moves, or the like. Optionally, the vehicle controller can receive input from the operator onboard and/or remotely located from the vehicle and control the propulsion and/or brake system accordingly to control movement of the vehicle.

The database represents one or more tangible and non-transitory computer readable storage media, such as one or more computer hard drives, removable drives, optical disks, flash drives, or the like. The database can store locations of routes 122 on which the vehicle can travel, such as the locations and/or layouts of roads, highways, designated or government waterways or shipping channels, designated or government approved flight paths or plans, previously designated paths, boundaries of grounds in which crops are planted, mining routes, or the like. The location of the vehicle on the routes can be used by the vehicle controller to determine how to control movement of the vehicle (e.g., to abide by speed limits, to avoid putting too much stress or wear-and-tear on the vehicle, to avoid colliding with another vehicle, etc.)

Certain segments of the routes may have sharper curves (e.g., smaller radii of curvature than other segments), steeper inclines than other segments, steeper declines than other segments, more vehicular traffic than other segments, more pedestrian traffic than other segments, more undulations than other segments, poorer weather conditions than other segments, or the like. Having accurate and timely PNT information (also referred to herein as positional data) for automated and/or manual control of the vehicle in these segments can provide for safer travel of the vehicle. But, having inaccurate or no PNT information for control of the vehicle in these segments can result in increased risk of unsafe travel of the vehicle.

The positional data is collected by the receiver (e.g., via receipt of one or more positional data signals via one or more antennas 124), and is sent to the security controller. Messages from the receiver to the security controller may be in a standard format, such as NMEA, which is the abbreviation for the National Marine Electronics Association. The information from the receiver can be sent to the security controller at a rate of once per second. Optionally, the security controller can direct the receiver to increase the rate at which the positional data or information is sent from the receiver to the security controller. For example, the receiver can be directed to provide the positional information at an updated (e.g., faster) rate, such as five or ten hertz. In one embodiment, the security controller can track the positional information provided from the receiver over time and look for variations in the positional information to determine whether the receiver is being jammed or spoofed by the communication device 108, whether the receiver is receiving accurate positional information from the external communication device(s), and/or whether the positional information received by the receiver is negatively impacted by environmental and/or equipment conditions.

The security and/or vehicle controllers can use a storage device, such as the database (which can be even a secure encrypted storage device) to store information about the route to be travelled. For example, a rail vehicle can store or download a route database that contains information about the speed limits, route locations and/or layouts, and elevation changes. By encrypting the route information, if one or more of the components onboard the vehicle become compromised by a cyber security attack (e.g., by an external communication device), the route information stored in the database will remain safe and secure.

Figure 2:
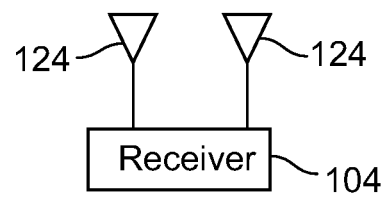
FIG. 2 illustrates one embodiment of a multi-antenna global navigation satellite system receiver.
Figure 3:
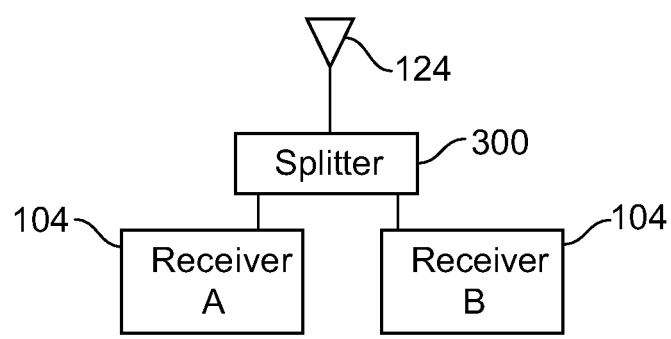
FIG. 3 illustrates one embodiment of a single antenna, multi-receiver global navigation satellite system receiver.

While the embodiment of the verification system shown in FIG. 1 includes a single antenna coupled with the receiver, optionally, multiple antennas can be used to increase protection against spoofing by an external communication device (e.g., impersonating one of the external communication devices). For example, the verification system may include multiple antennas that are coupled with the same receiver to provide the receiver with multiple positional data signals (see FIG. 2). Alternatively, the verification system may include multiple antennas and multiple receivers, with each of two or more receivers connected with a different antenna and each of these antennas connected to only a single receiver. Optionally, a single antenna can be coupled with multipole receivers by a splitter 300 (shown in FIG. 3). The splitter divides or otherwise splits the received positional data signals received by the single antenna among the multiple receivers.

In one embodiment where the verification system includes multiple antennas, the antennas may have different characteristics and/or otherwise operate differently from each other. For example, one antenna can be an active antenna that is powered by an engine, battery, flywheels, or the like, and another antenna can be a passive antenna that is powered only by energy in the received positional data signals. The active antenna consumes more electric power, but may be affected less by data positional signals sent by the external communication device to jam an active antenna when equipped with a filter (relative to a passive antenna).

The receiver(s) can be connected with the security controller by one or more secure data communications buses. The antennas may be installed on the vehicle with a large distance between the antennas (e.g., the greatest possible distance between the antennas given the size of the vehicle). For example, one antenna can be installed on the nose of an aircraft vehicle and another antenna can be installed on a tail of the same aircraft vehicle. The security controller can track an ongoing hysteresis of the signal strength of both receivers to allow for the security controller to determine whether any large increases or decreases in the signal strength (e.g., the signal strength increases or decreases by more than a designated amount, such as 30%, 40%, 50%, 100%, or the like). Such an increase or decrease can indicate a spoofing attack from an external device or that the received positional data signals are not reliable (e.g., not accurate). The security controller can suppress modulus interference, and subtract and estimate structured interference or jamming caused by the positional data signal(s) sent from an external device. This allows for the security controller to continue receiving accurate or valid positional information from positional data signals.

The verification system optionally includes and/or is coupled with one or more sensors 126. In one embodiment, the sensors include one or more accelerometers or other devices capable of measuring inertia and/or movement of the vehicle. The sensors may not rely on receiving wireless (e.g., radio frequency) signals to measure or detect movement of the vehicle, and therefore may not be vulnerable to spoofing or jamming signals sent from an external device. Optionally, the security controller can receive output data from the sensors that indicate movement of the vehicle. The security controller can compare the movement information from the data provided by the sensors with the positional information obtained from the positional data signals received from the receiver. This comparison can reveal whether the position and/or velocity of the vehicle as indicated by the sensor data differs from the position and/or velocity of the vehicle as indicated by the positional information. These differences can indicate errors in the measured position and/or velocity of the vehicle, and can be reduced by the security controller combing the data from the different sources. For example, the controller can average or otherwise combine the information from (or derived from) the sensors with the information from the receiver. Optionally, the sensors can be used for short term backup during a spoofing attack or when the positional data signals from the external devices are not available (e.g., during travel through a tunnel).

One of the sensors can include a clock that maintains a current time onboard the vehicle. This clock can be powered by one or more onboard sources of electric current, such as an alternator, generator, flywheel, solar panel(s), or the like. The clock can be coupled with a battery backup to ensure that the clock remains operational in the event of a failure of another source of current for the clock. The security controller can repeatedly update the time being tracked by the clock using the PNT information received from the positional data signals (e.g., using a timing message such as $GPZDA). If the security controller determines that a large amount of time (e.g., the day, month, or year) from the positional data signal(s) is different than the time being tracked by the onboard clock, the security controller will discard the positional data signal or mark the positional data signal as invalid. This may indicate that the positional data signal was received from a spoofing or jamming device or that this signal is otherwise inaccurate.

The receiver can provide the latitude (or north-south location) and the longitude (or east-west location) geographic position on the Earth's surface to the vehicle. The security controller can keep track of the changes in position to make sure the changes do not violate the ability of vehicle. For example, changes that would indicate that the vehicle is moving faster than is possible, that the vehicle is moving to locations that the vehicle cannot travel to, that the vehicle is moving in directions that the vehicle cannot travel, etc., can indicate to the security controller that the received signals are not accurate. If the position is out of range or changed drastically, the received signals can be discarded by the security controller or marked as invalid (and not used). As another example, the security controller can compare different NMEA messages received via the signals to make sure the positions indicated by the messages agree with each other. For example, the $GPGGA and $GPRMC in these types of messages both can contain position information.

The security controller can compare the vehicle speed (e.g., obtained from a speedometer, tachometer, or the vehicle controller) with information received from the positional data signals. If the difference in speeds from the sensor (e.g., the speedometer or tachometer) differs from the speed as determined from the positional data signals (e.g., by more than 10%, more than 20% or another threshold), then the security controller can determine that the positional data signals are not accurate.

As another example, the receiver can provide the security controller with the speed of the vehicle based on the received positional data signals. This information can be communicated in a $GPRMC message. The vehicle may only be able to travel at speeds below a designated limit based on the route information in the database. For example, different segments of the routes may have speed limits, may be under maintenance, may be subject to a slow order, may have automatic speed controls (e.g., Positive Train Control), or the like, that prevents or limits how quickly the vehicle can travel over or through those segments, whether the vehicle can travel over certain route segments, etc. Information in positional data signals that indicates that the vehicle is violating these speed limits (e.g., by at least a designated threshold, such as the vehicle traveling 110% of the speed limit, 120% of the speed limit, or the like) and/or is traveling toward a location that the vehicle is not permitted to travel can result in the security controller determining that the positional data signals are inaccurate or invalid.

The security controller can monitor apparent acceleration or deceleration of the vehicle based on information in the positional data signals received by the receiver. If the information in the positional data signals indicates that the vehicle is accelerating faster than the propulsion system of the vehicle can accelerate or that the vehicle is decelerating faster than the braking system can brake, then the security controller can determine that the positional data signals are invalid or inaccurate. As another example, the security controller can communicate with the vehicle controller, the propulsion system, the braking system, and/or the database to determine if the apparent acceleration or deceleration is inconsistent or incompatible with the throttle setting or engine speed of the propulsion system, with the brake setting of the braking system, and/or the grade of the route from the database. If the apparent acceleration or deceleration is inconsistent or incompatible with this information, then the security controller can determine that the positional data signals are invalid or inaccurate.

The security controller can monitor the altitude of the vehicle based on the positional data signals received by the receiver. The security controller is aware of how the vehicle can change altitude given the information stored in the database. For example, if the altitude of the vehicle appears to change (based on the received positional data signals) in a way that is incompatible with the route information (or in a way that the vehicle is not capable of moving), then the security controller can determine that the positional data signal is not valid or is inaccurate. As one example, if the vehicle is a ground-based vehicle and the positional data signal indicates that the vehicle is not traveling on a route or is not traveling on the ground, then the security controller can determine that the positional data signal cannot be used or relied upon to safely control operation of the vehicle.

The security controller can examine the vehicle speed using a source of information other than the receiver, and determine when the vehicle is not moving. The security controller can then set the operating mode of the receiver to position hold. In this mode, the receiver can operate with receiving positional data signals from as few as one external communication device to provide timing measurements. This can allow the security controller to operate with a high-elevation satellite as the external communication device and provide protection against receiving inaccurate positional data signals from another external communication device.

The security controller can determine a direction in which the vehicle is moving based on the received positional data signals. This direction can be determined or reported in two places: (1) either north or south and (2) either east or west. The security controller can monitor these directions over time, and positional data signals can be disregarded or ignored (e.g., not used to control movement or operation of the vehicle) responsive to these directions suddenly changing or fluctuating. For example, if the direction is determined to change from north and east to south and west within less than one second (or another time period that is too short for the vehicle to actually change heading in this way), then the security controller can determine that the received positional data signals are not accurate (and can ignore the positional data signals).

The security controller optionally can examine the elevation from which a positional data signal is received to determine the validity or accuracy of the positional data signal. For example, valid, authentic positional data signals may be sent by satellite devices that are detected by the security controller to have high elevations. Invalid or inauthentic (e.g., spoofing or jamming) positional data signals sent by a spoofing device or that are otherwise inaccurate may be detected by the security controller to come from a lower elevation, such as within ten meters of the horizon. The security controller can examine the elevation from which a signal positional data 102 received, and discard or ignore positional data signals received from elevations lower than a designated threshold (e.g., ten meters).

The security controller can track how many external communication devices that the receiver is receiving positional data signals from. The vehicle could be traveling in a city where tall buildings reflect the positional data signals, or the vehicle could be traveling through a tunnel. The receiver can operate in two dimensional or three-dimensional geometry. To use three-dimensional geometry, the receiver will use the information in positional data signals received from at least four external communication devices. If the receiver has a three-dimensional lock (e.g., the receiver is receiving positional data signals from the same four external devices) for a long period of time (e.g., longer than a designated period of time, such as five minutes), and/or the security controller examines the database to determine that the receiver should be able to maintain this lock for this long period of time, then any changes to the number of external devices in the lock can be identified by the security controller as a potential spoofing or jamming attack. For example, if the receiver can only lock onto three or fewer external devices during this time period, then the security controller can determine that the receiver is being spoofed or jammed.

The security controller can examine the dilution of precision (DOP) of the positional data signals that are received. The DOP can indicate the accuracy of the lock or fix on the external devices by the receiver. The security controller can monitor the DOP over time and examine changes in the DOP. Large variations in the horizontal and/or vertical DOP (e.g., more than one or more designated thresholds) can indicate that the positional data signals are no longer accurate and/or are coming from a spoofing or jamming external device 108.

The security controller can receive a "satellites in view" message from the receiver that provides data about the current number of external communication devices from which the receiver is receiving positional data signals to fix (e.g., determine) the position of the vehicle. Each of these messages may only store information for up to a designated number of external communication devices (e.g., up to four satellites), and multiple messages may be received. Each message can include a unique identification for each of these external communication devices. This identification can be a pseudo-random noise number or sequence. The security controller also can track the signal-to-noise ratio of the positional data signals over time. The security controller can determine if the identifications of the external communication devices and/or the signal-to-noise ratio of the positional data signals received from an external communication device changes over time, and can determine if the positional data signals contain accurate information based on these changes. For example, sudden or temporary changes in the identifications of the external communication devices and/or in the signal-to-noise ratio of positional data signals received from a device can indicate that the receiver is receiving an inaccurate positional data signal from another external communication device or a positional data signal from an external communication device that is interfered with.

The security controller can perform a validation check of the format of the positional data signals being received by the receiver. The message formats and values for the positional data signals may be defined by a standards organization or association, such as the National Marine Electronics Association (NMEA). Positional data signals or values in the positional data signals that do not meet or follow the specification can be identified by the security controller as invalid or inaccurate positional data signals. For example, a positional data signal received that reports a geoid height of only eight kilometers can be identified by the security controller as being incorrect, and an invalid or inaccurate signal positional data.

One or more of the external communication device can have a unique code or identifier. For example, each satellite may have a "pseudo-random noise" (PRN) sequence, or gold code. This number is different and unique for each satellite. The United States government maintains a list of valid PRNs and the satellite status showing if the satellite has been retired or is still in operation. By adding a check of the received PRN values against known good PRN values a determination can be made as to whether or not the message is valid.

The security controller can store the PNT data received in the positional data signals during a trip of the vehicle (e.g., in the database). This PNT data can be compared with the expected movement of the vehicle. The expected movement can be the layout of the routes traveled by the vehicle, as well as the times at which the vehicle is expected or scheduled to be at different locations along the routes. If the expected movement differs from the PNT data from the received positional data signals (e.g., by more than a threshold amount), then the security controller can determine that the locations along the routes where the differences occur are areas of poor reception of positional data signals and/or a potential attack by an external communication device. For example, a rail vehicle may have an area in a city or when the rail vehicle travels through a tunnel where a disruption in receipt of the positional data signals is expected. Identifying disruption in other areas can indicate other problems or a potential attack by an external communication device. The security controller can analyze the routes traveled upon and the route information in the database to modify or improve the accuracy of the database to aid in preventing future attacks.

Figure 4:
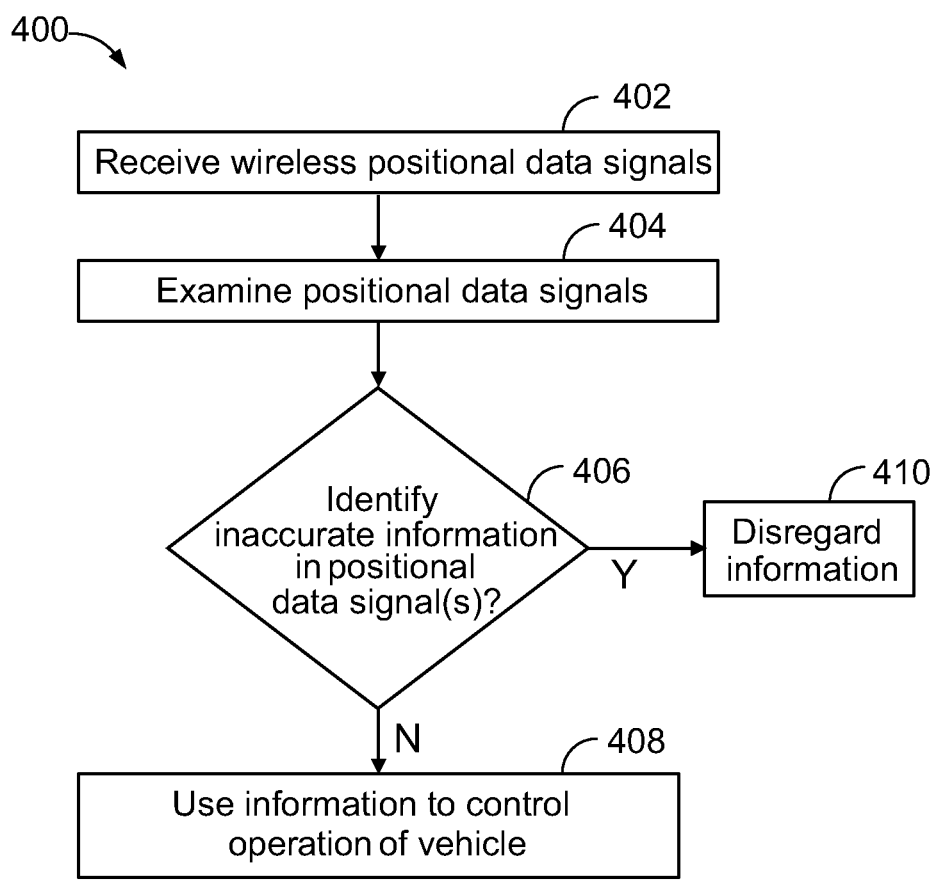
FIG. 4 illustrates a flowchart of one embodiment of verifying positional data signals.

FIG. 4 illustrates a flowchart of one embodiment of a method 400 for verifying the accuracy of positional signals received by a vehicle. The method 400 can represent operations performed by the verification system shown in FIG. 1 and/or FIG. 5. At 402, wireless positional data signals are received. These can be positional data signals received by the receiver onboard the vehicle from one or more of the external communication devices. At 404, the positional data signals are examined. The security controller can examine information contained in the positional data signals and/or can compare this information with limitations or restrictions of the vehicle, with route information from the database, with standards of the positional data signals, or the like.

At 406, a determination is made as to whether a received positional data signal includes inaccurate information. For example, the security controller can examine the information conveyed by positional data signal(s) to determine whether the positional data signals are inaccurate or invalid, as described above. If the security controller determines that the positional data signal is not inaccurate or invalid (e.g., the information is accurate or valid), then flow of the method 400 can proceed toward 408. Otherwise, flow of the method 400 can proceed toward 410, where the information in the signal is disregarded. For example, the security controller does not use the information in the positional data signal to control operation of the vehicle. Flow of the method 400 can then terminate or return toward 402.

At 408, the information in the received signal is used to control or impact control of the vehicle. For example, the vehicle controller can use the PNT information in a valid positional data signal to control a throttle setting, brake setting, speed, etc., of the vehicle. Flow of the method 400 can return toward 402, or the method 400 can then terminate.

Figure 5:
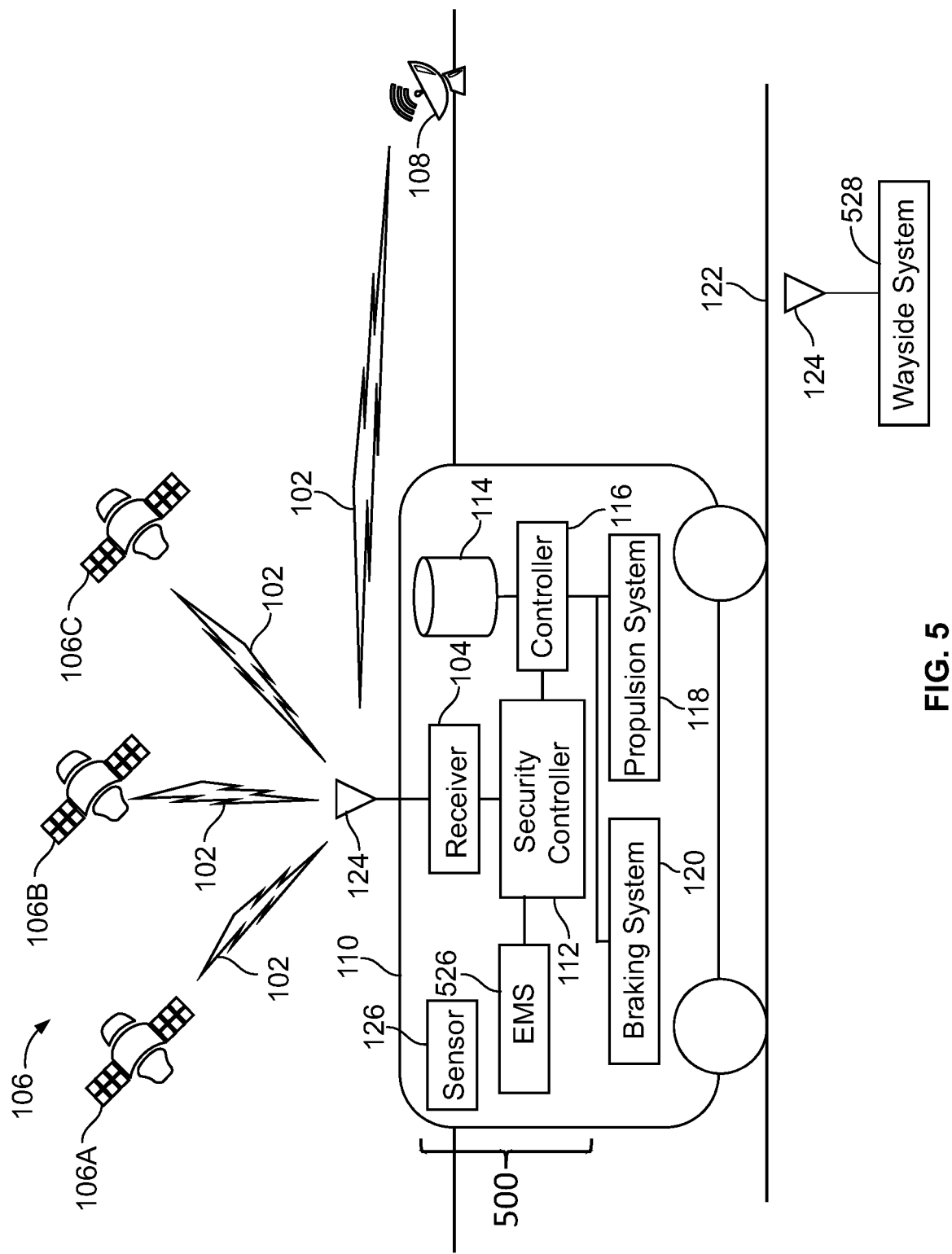
FIG. 5 illustrates one embodiment of another positioning data verification system.

FIG. 5 illustrates a location verification system 500 according to another embodiment. The location verification system 500 includes many of the same components of the location verification system 100 shown in FIG. 1, as shown in FIG. 5. The location verification system may include an energy management system 526 ("EMS" in FIG. 5) that determines how to control the vehicle during movement of the vehicle over one or more routes. The EMS represents hardware circuitry that includes and/or is connected with one or more processors. The EMS may be embodied in one or more of the same processors as the vehicle controller or different processors than the vehicle controller.

The EMS can create, obtain, calculate, or otherwise determine operational settings of the vehicle for different locations, times, and/or distances (along routes). These operational settings can be throttle settings, brake settings, speeds, accelerations, headings, or the like. The EMS can determine a trip plan that designates (e.g., dictates) different operational settings for different instances of upcoming movement of the vehicle (e.g., different operational settings at different upcoming route locations, at different upcoming times, and/or at different distances along the route). The trip plan can then be implemented by the vehicle controller to control or change movement of the vehicle. For example, as the vehicle reaches a location, time, or distance associated (by the trip plan) with a different operational setting, the vehicle controller can automatically change the current operational setting of the vehicle to match or be closer to the trip plan-designated operational setting than the current operational setting. Or, the vehicle controller can provide a notification (e.g., an audible and/or text-based presentation on a display device) to an operator of the vehicle on how to change the operational setting of the vehicle to match or be closer to the trip plan-designated operational setting than the current operational setting.

The operational settings can be determined by the EMS to drive the vehicle to achieve one or more operational goals. For example, the operational settings can be selected to cause the vehicle to reduce fuel consumption during a trip to a destination location while arriving at the location within a designated time (relative to the vehicle traveling according to other settings, such as upper speed limits of the routes). Optionally, the operational settings can be selected to cause the vehicle to reduce emission generation (relative to the vehicle traveling according to other settings). Optionally, the operational settings can be selected to cause the vehicle to reduce audible noise generation (relative to the vehicle traveling according to other settings). Optionally, the operational settings can be selected to cause the vehicle to reduce wear and tear on the vehicle (relative to the vehicle traveling according to other settings).

Having accurate determinations of vehicle locations can be important for determining trip plans and/or controlling the vehicle according to a trip plan. For example, an incorrect location can be detrimental to determining which operational setting should currently be used for control of the vehicle. This can result in unsafe and/or inefficient operation of the vehicle. For example, the vehicle may operate at an unsafe speed, brake at an incorrect location, and/or accelerate at an incorrect location if the location determined from positional data signals is not accurate. The location verification system can ensure that the location(s) of the vehicle that is determined from the positional data signals is accurate so that the vehicle safely and/or efficiently travels according to a trip plan.

The vehicle controller optionally can communicate with one or more wayside systems 528 that are off-board the vehicle. The wayside system can include one or more computerized components that determine, generate, and communicate notification signals (e.g., via an antenna) to vehicles. These notification signals are used by the vehicle controller to determine permissible and/or impermissible movements of the vehicle. For example, the wayside system can represent the Positive Train Control system, a traffic control system, or the like, that dictates how, where, and/or when vehicles can move on routes. The wayside system represents hardware circuitry that includes and/or is connected with one or more processors that determine where vehicles can travel, how fast the vehicles can travel, and the like. For example, the wayside system can receive operator input, input from sensors (route occupancy sensors, gates, switches, etc.) to determine where vehicles are located on different routes, where maintenance is being performed on routes, and the like. The wayside system can use this information to communicate the notification signals to the vehicle controllers of various vehicles so that vehicles safely travel on the routes and avoid collisions. The wayside system can warn a first vehicle approaching the location of a second vehicle to slow down or stop, can warn a vehicle approaching the location of a maintenance crew to slow down or stop, can warn a vehicle approaching the location of a small radius of curvature in the route to slow down, or the like.

The vehicle controller can receive the notification signals from the wayside system and use the information contained in the notification signals to determine where the vehicle needs to avoid travel, slow down, or stop. But, to safely control the vehicle to slow down or stop based on the notification signals, the vehicle controller may need to know the accurate location of the vehicle. For example, if the location of the vehicle is not accurately known, the vehicle controller may drive the vehicle into a collision with another vehicle, may drive the vehicle too fast through a sharp curve in the route and/or a maintenance crew, or the like. The wayside system may only communicate notices of locations of other vehicles, areas to avoid, and/or areas to slow down, but may not direct operational settings of a vehicle in the notification signals. Instead, the vehicle controller receives the notification signals and determines whether to slow down, stop, or change which route is traveled upon based on the notification signals received from the wayside system.

Having accurate determinations of vehicle locations can be important for the vehicle controller to determine how to control movement of the vehicle based on the notification signals received from the wayside system. For example, an incorrect location can be detrimental to determining when and/or where to slow down, stop, or change which route the vehicle is traveling along. The location verification system can ensure that the location(s) of the vehicle that is determined from the positional data signals is accurate so that the vehicle can safely travel using or based on the notification signals.

In one embodiment, a method (e.g., for verifying positional data signals) includes examining positional data signals onboard a vehicle to identify one or more variations in positioning data of the positional data signals, and identifying inaccurate positioning data in the positional data signals based on the one or more variations in the positioning data that are identified. The method optionally includes receiving at least one wireless positional data signal at one or more antennas of a global positioning system receiver that is located onboard the vehicle from one or more communication devices located off-board of the vehicle. Each positional data signal can include positioning data indicative of one or more of a location of the communication device that sent the positional data signal or a time at which the communication device sent the positional data signal. The method also can include identifying inaccurate positioning data by identifying at least one of the communication devices as a spoofing device, at least one of the communication devices as a signal jamming device, at least one of the communication devices as a malfunctioning device, at least one of the communication devices as sending inaccurate positioning data in the positional data signals, and/or an environmental condition that distorts or changes the positional data signals an amount that is greater than a threshold distortion value.

Optionally, the method can include changing movement of the vehicle responsive to identifying inaccurate positioning data. The positional data signals of two or more communication devices can be wirelessly received at the same antenna. The method optionally can include increasing an update rate at which the global positioning system receiver communicates information of the positional data signals to a security controller in response to identifying inaccurate positioning data.

The positional data signals can be examined by calculating a dilution of precision based on the positioning data included in the positional data signals. At least one communication device can be identified as a spoofing device or a jamming device responsive to the dilution of precision changing by more than a designated threshold value within a designated time period.

The method optionally can include receiving the positional data signals at a first antenna of a first global positioning system receiver that is located onboard the vehicle. The method also can include receiving additional positional data signals at a second antenna of a second global positioning system receiver that is located onboard the vehicle, and examining the positional data signals and the additional positional data signals by tracking hysteresis in signal strengths of the positional data signals received at each of the first and second antennas. At least one communication device can be identified as a spoofing device or a jamming device responsive to the hysteresis in the signals' strength of the positional data signals received at one of the first or second antennas increasing or decreasing by more than a designated threshold value while the hysteresis in the signal strength of the positional data signals received at the other of the first or second antennas not increasing or decreasing by more than the designated threshold value.

The method optionally can include identifying at least one of the positional data signals as being inaccurate positioning data, subtracting the positioning data included in the positional data signals being sent from the inaccurate positioning data, and using the positioning data from the positional data signals after subtracting the inaccurate positioning data to control movement of the vehicle.

The positional data signals can be examined by determining a movement heading based on the positioning data received in the positional data signal received from one or more communication devices located off-board the vehicle, and determining inaccurate positioning data responsive to the movement heading being inconsistent with one or more of a direction in which the vehicle is moving or directions in which the vehicle is able to move. The directions in which the vehicle can move can be determined from a route database located onboard the vehicle. The route database can store encrypted data indicating locations of available routes on which the vehicle can travel.

The positional data signals can be received at the one or more antennas while the vehicle is stationary, and at least one of the positional data signals can be identified as inaccurate and/or at least one of the communication devices can be identified as a spoofing device or a jamming device responsive to the positioning data being inconsistent with the vehicle being stationary. The positional data signals can be examined by determining an elevation of the at least one communication device based on receipt of one or more of the positional data signals sent from the at least one communication device, and identifying at least one of the positional data signals is inaccurate or at least one communication device is the spoofing device or the jamming device responsive to the elevation of the at least one communication device being within a designated spatial range of a horizon.

The positional data signals can be examined by determining whether the one or more antennas of the global positioning system receiver have received the positional data signals from a designated number of the communication devices for at least a designated period of time, determining whether the one or more antennas of the global positioning system receiver will be able to continue receiving the positional data signals from the designated number of the communication devices for at least an upcoming period of time, examining the positional data signals includes determining a number of the communication devices from which positional data signals are received, and identifying at least one of the communication devices as the spoofing device or the jamming device, or at least one of the positional data signals is inaccurate, responsive to the determined number of the communication devices differing from the designated number of the communication devices.

The positional data signals that are received also can include identifiers of one or more communication devices. The identifiers of the communication devices can be examined by examining the positional data signals by calculating one or both of a signal strength and a signal-to-noise ratio of two or more of the positional data signals that are received by an antenna, and identifying at least one communication device as inaccurate, or as a spoofing device or a jamming device, responsive to at least one of: a change in the identifier of the communication device, a change in the signal strength of a positional data signal above a determined strength threshold value for the communication device having the identifier, and a change in the signal-to-noise ratio above a determined ratio threshold value of a positional data signal received from the communication device. At least one communication device is not identified as the spoofing device or the jamming device unless both the change in the identifier and the change in the signal-to-noise ratio are identified in one embodiment.

The positional data signals can be examined by calculating a moving speed of the vehicle based on the positioning data over a period of time from positional data signals received from one or more communication devices, comparing the calculated moving speed of the vehicle with a measured moving speed of the vehicle, and identifying at least one of the communication device as a spoofing device or a jamming device responsive to the calculated moving speed of the vehicle differing from the measured moving speed of the vehicle being greater than a determined speed threshold value.

The positional data signals can be examined by calculating a moving speed of the vehicle based on the positioning data received from the positional data signals received from one or more communication devices, comparing the calculated moving speed of the vehicle with a designated upper speed at which the vehicle can move, and identifying at least one of the communication devices as inaccurate, or as a spoofing device or a jamming device, responsive to the calculated moving speed of the vehicle exceeding the designated upper speed of the vehicle.

The positional data signals optionally can be examined by calculating one or more of an acceleration or deceleration value of the vehicle based on the positioning data received from the positional data signals received from one or more communication devices, and identifying at least one of the communication devices as inaccurate, or as a spoofing device or a jamming, device responsive to the one or more of the acceleration or deceleration value exceeding one or more designated threshold acceleration or deceleration values.

The positional data signals optionally can be examined by storing the positioning data obtained from the positional data signals received by an antenna at different locations along one or more routes over which the vehicle travels for a trip, comparing a set of the positioning data received at the different locations with a known layout of the one or more routes over which the vehicle traveled, and the known layout comprising one or more geographic areas, and determining whether the set of positioning data for the different locations aligns to the known layout.

Optionally, the method also can include receiving sensor data from one or more sensors located onboard the vehicle, comparing the sensor data with the positional data received from at least one of the communication devices, and determining whether a discrepancy between the sensor data and the positional data is larger than a determined threshold discrepancy value associated with the sensor data. The sensor data can be obtained from one or more inertial sensors, and the at least one of the communication devices is identified as a spoofing device or a jamming device responsive to a heading of the vehicle as indicated by the sensor data differing from a heading of the vehicle that is based on the positioning data received from the at least one of the communication devices. The sensor data can be obtained from one or more speed sensors, and the at least one of the communication devices is identified as a spoofing device or a jamming device responsive to a speed of the vehicle as indicated by the sensor data differing from a speed of the vehicle that is based on the positioning data received from the at least one of the communication devices.

The positional data signals can indicate a transmission time and the sensor data is obtained from one or more clocks, and at least one of the communication devices is identified as inaccurate, or as a spoofing device or a jamming device, responsive to the time indicated by the positional data signal received from the at least one communication device differing from a time indicated by the one or more clocks. Receiving the sensor data and comparing the sensor data with the positional data can occur while an antenna is unable to receive the positional data signals sent from a global positioning system broadcasting device. Optionally, receiving the sensor data and comparing the sensor data with the positional data can occur while the vehicle is traveling through a tunnel.

In one embodiment, a system or method described herein receives wireless positional data signals at antennas of a global positioning system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal. Hysteresis in signal strengths of the positional data signals received at each of the antennas is tracked, and at least one of the communication devices is identified as being a faulty device, a spoofing device, or a jamming device, or that environmental factors are causing the communication device to send an inaccurate positional data signal in response to the hysteresis in the signals strength of the positional data signals received at one of the antennas increasing or decreasing by more than a designated threshold value while the hysteresis in the signal strength of the positional data signals received at a different antenna not increasing or decreasing by more than the designated threshold value.

Movement of the vehicle can be changed responsive to identifying an inaccurate positional data signal. The positional data signals can be wirelessly received at the same antenna. The system or method can increase an update rate at which the global positioning system receiver communicates information of the positional data signals to a security controller. Optionally, the system or method can identify the positional data signals being sent from the spoofing device or the jamming device, subtract the positioning data included in the positional data signals being sent from the spoofing device or the jamming device, and use the positioning data from the positional data signals after subtracting the positioning data sent from the spoofing device or the jamming device to control movement of the vehicle.

In one embodiment, a system or method described herein can receive wireless positional data signals at one or more antennas of a global positioning system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal. The system or method determine an elevation of at least one of the communication devices at a security controller based on receipt of one or more of the positional data signals sent from the at least one communication device, and identify the at least one communication device as a spoofing device or a jamming device that is sending inaccurate positioning data responsive to the elevation of the at least one communication device being within a designated spatial range of a horizon.

The vehicle controller can change movement of the vehicle responsive to identifying the at least one of the communication devices as the spoofing device or the jamming device. The positional data signals can be wirelessly received at the same antenna. An update rate at which the global positioning system receiver communicates information of the positional data signals to the security controller can be increased by the security controller.

The security controller also can identify the positional data signals being sent from the spoofing device or the jamming device, subtract the positioning data included in the positional data signals being sent from the spoofing device or the jamming device, and use the positioning data from the positional data signals after subtracting the positioning data sent from the spoofing device or the jamming device to control movement of the vehicle.

In one embodiment, a method includes receiving wireless positional data signals at one or more antennas of a global positioning system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal, determining whether the antenna of the global positioning system receiver has received the positional data signals from a designated number of the communication devices for at least a designated period of time, determining whether the antenna of the global positioning system receiver will be able to continue receiving the positional data signals from the designated number of the communication devices for at least an upcoming period of time, determining whether the positional data signals are received from a different number of the communication devices, and identifying at least one of the communication devices as a spoofing device or a jamming device that is sending inaccurate positioning data responsive to the different number of the communication devices differing from the designated number of the communication devices.

Optionally, the method includes changing movement of the vehicle responsive to identifying the at least one of the communication devices as the spoofing device or the jamming device.

The positional data signals can be wirelessly received at the same antenna.

The method also can include increasing an update rate at which the global positioning system receiver communicates information of the positional data signals to the security controller. The method can include identifying the positional data signals being sent from the spoofing device or the jamming device, subtracting the positioning data included in the positional data signals being sent from the spoofing device or the jamming device, and using the positioning data from the positional data signals after subtracting the positioning data sent from the spoofing device or the jamming device to control movement of the vehicle.

In one embodiment, a method includes receiving wireless positional data signals at one or more antennas of a global positioning system receiver that is located onboard a vehicle from one or more communication devices located off-board of the vehicle. Each of the positional data signals includes positioning data indicative of one or more of a location of the communication device that sent the positional data signal or a time at which the communication device sent the positional data signal. Each of the positional data signals also includes a unique identifier of the communication device that sent the positional data signal. The method can include calculating signal-to-noise ratios of the positional data signals using the global positioning system receiver, examining the positional data signals at a security controller by calculating signal-to-noise ratios of the positional data signals that are received by the antennas, and identifying at least one communication device as a spoofing device or a jamming device that is sending inaccurate positioning data responsive to both a change in the unique identifier of the at least one communication device and a change in the signal-to-noise ratio of the positional data signals received from the at least one communication device.

Optionally, the method can include changing movement of the vehicle responsive to identifying the at least one of the communication devices as the spoofing device or the jamming device. The positional data signals can be wirelessly received at the same antenna.

Optionally, the method can include increasing an update rate at which the global positioning system receiver communicates information of the positional data signals to the security controller. At least one of the communication devices is not identified as the spoofing device or the jamming device unless both the change in the unique identifier and the change in the signal-to-noise ratio are identified.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method for verifying a location of a vehicle, the method comprising:
   receiving positional data signals from one or more off-board communication devices, the positional data signals received at a first antenna of a first global satellite system (GNSS) receiver and a second antenna of a second GNSS receiver onboard the vehicle;
   examining the positional data signals to identify one or more characteristics in positioning data of the positional data signals, the one or more characteristics including increases or decreases in strengths of the positional data signals;
   identifying inaccurate positioning data in the positional data signals based on the one or more characteristics in the positioning data that are identified, the inaccurate positioning data identified responsive to the strengths of the positional data signals increasing or decreasing by more than a designated threshold value;
   receiving additional positional data signals at the second antenna of the second GNSS, and
   examining the positional data signals and the additional positional data signals by determining the increases or the decreases in the strengths of the positional data signals and the additional positional data signals received at the first and second antennas, wherein at least one communication device of the one or more off-board communication devices is identified as a spoofing device or a jamming device responsive to a change in a strength of the strengths of the one or more of the positional data signals or the additional positional data signals received at one of the first or second antennas increasing or decreasing by more than the designated threshold value while the increases or the decreases in the strength of the one or more of the positional data signals or the additional positional data signals received at the other of the first or second antennas not increasing or decreasing by more than the designated threshold value.

2. The method of claim 1, wherein:
   the positional data signals include at least one wireless positional data signal received at the one or more off-board communication devices located off-board the vehicle, each of the positional data signals including the positioning data indicative of one or more of a location of the one or more off-board communication devices that sent the at least one wireless positional data signal or a time at which the one or more off-board communication devices sent the at least one wireless positional data signal; and
   identifying the inaccurate positioning data comprises identifying one or more of:
   the one or more off-board communication devices as the spoofing device,
   the one or more off-board communication devices as the jamming device,
   the one or more off-board communication devices as a malfunctioning device,
   the one or more off-board communication devices as sending inaccurate positioning data in the positional data signals, or
   an environmental condition that distorts or changes the positional data signals an amount that is greater than a threshold distortion value.

3. The method of claim 2, further comprising changing movement of the vehicle responsive to identifying the inaccurate positioning data.

4. The method of claim 1, wherein the positional data signals are received while the vehicle is stationary, and identifying at least one of the positional data signals as inaccurate or identifying the one or more off-board communication devices as the spoofing device or the jamming device responsive to the positioning data in at least one of the positioning data signals received from the one or more off-board communication devices being inconsistent with the vehicle being stationary.

5. The method of claim 1, wherein examining the positional data signals includes:
   determining whether the first antenna of the first GNSS receiver and the second antenna of the second GNSS receiver onboard the vehicle have received the positional data signals from a designated number of the off-board communication devices for at least a designated period of time;
   determining whether the first antenna of the first GNSS receiver and the second antenna of the second GNSS receiver will both be able to continue receiving the positional data signals from the designated number of the communication devices for at least an upcoming period of time;
   examining the positional data signals includes determining a first number of the off-board communication devices from which positional data signals are received; and
   identifying at least one of the off-board communication devices as the spoofing device or the jamming device, or at least one of the positional data signals is inaccurate, responsive to the first number of the off-board communication devices differing from the designated number of the off-board communication devices.

6. The method of claim 1, further comprising:
   subtracting the positioning data included in the positional data signals being sent from the inaccurate positioning data; and
   using the positioning data from the positional data signals after subtracting the inaccurate positioning data to control movement of the vehicle.

7. The method of claim 1, wherein examining the positional data signals includes determining a movement heading based on the positioning data received in the positional data signals received from one or more off-board communication devices located off-board the vehicle; and
   the inaccurate positioning data is identified responsive to the movement heading being inconsistent with one or more of a direction in which the vehicle is moving or directions in which the vehicle is capable of moving.

8. The method of claim 7, further comprising determining the directions in which the vehicle is capable of moving from a route database located onboard the vehicle.

9. The method of claim 8, wherein the route database stores encrypted data indicating locations of available routes on which the vehicle can travel.

10. A system comprising:
one or more processors configured to examine examining positional data signals received onboard a vehicle from one or more off-board communication devices, wherein the positional data signals are received by a first antenna of a first Global Navigation Satellite System (GNSS) receiver and a second antenna of a second GNSS receiver onboard the vehicle, and the one or more processors are configured to identify one or more characteristics in positioning data of the positional data signals, the one or more characteristics including increases or decreases in strengths of the positional data signals,
the one or more processors configured to identify inaccurate positioning data in the positional data signals based on the one or more characteristics in the positioning data that are identified, the one or more processors configured to identify the inaccurate positioning data responsive to the strengths of the positional data signals increasing or decreasing by more than a designated threshold value;
the one or more processors are configured to receive the positional data signals via the first antenna of the first GNSS receiver, the one or more processors are configured to receive additional positional data signals via the second antenna of the second GNSS receiver, the one or more processors are configured to examine the positional data signals and the additional positional data signals by determining the increases or the decreases in the strengths of the positional data signals received at the first antenna and the additional positional data signals received at the second antenna, the one or more processors are configured to identify a first communication device of the one or more off-board communication devices as a spoofing device or a jamming device responsive to the increases or the decreases in the strengths of one or more of the positional data signals or the additional positional data signals received at the first antenna increasing or decreasing by more than the designated threshold value while the increases or the decreases in the strengths of the one or more of the positional data signals or the additional positional data signals received at the second antenna do not increase or decrease by more than the designated threshold value.

11. The system of claim 10, wherein the positional data signals include at least one wireless positional data signal received at the first antenna of the first GNSS receiver and the second antenna of the second GNSS receiver that is located onboard the vehicle from the one or more off-board communication devices located off-board the vehicle, each of the positional data signals including the positioning data indicative of one or more of a location of the one or more off-board communication devices that sent the at least one wireless positional data signal or a time at which the one or more off-board communication devices sent the at least one wireless positional data signal,
wherein the one or more processors are configured to identify the inaccurate positioning data by identifying one or more of:
the one or more off-board communication devices as the spoofing device,
the one or more off-board communication devices as the jamming device,
the one or more off-board communication devices as a malfunctioning device,
the one or more off-board communication devices as sending the inaccurate positioning data in the positional data signals, or
an environmental condition that distorts or changes the positional data signals an amount that is greater than a threshold distortion value.

12. The system of claim 10, wherein the one or more processors are configured to change movement of the vehicle responsive to identifying the inaccurate positioning data.